United States Patent [19]

Ruchser

[11] 4,203,571
[45] May 20, 1980

[54] MULTIWAY SWITCHING VALVE

[75] Inventor: Erich Ruchser, Stetten, Fed. Rep. of Germany

[73] Assignee: Herion-Werke KG, Fellbach, Fed. Rep. of Germany

[21] Appl. No.: 917,395

[22] Filed: Jun. 20, 1978

[30] Foreign Application Priority Data

Jun. 30, 1977 [DE] Fed. Rep. of Germany ....... 2729482

[51] Int. Cl.² .................... F16K 11/07; F16K 31/122; F15B 13/042
[52] U.S. Cl. ............................... 251/31; 137/625.66; 137/625.69; 251/65
[58] Field of Search ....................... 137/625.66, 625.69; 251/65, 31

[56] References Cited

U.S. PATENT DOCUMENTS

| 3,203,439 | 8/1965 | Beckett | 251/65 X |
| 3,326,236 | 6/1967 | Beckett et al. | 251/65 X |
| 3,847,371 | 11/1974 | Norton et al. | 251/65 |

FOREIGN PATENT DOCUMENTS 1550632 1/1970 Fed. Rep. of Germany ...... 137/625.65

Primary Examiner—Gerald A. Michalsky
Attorney, Agent, or Firm—Michael J. Striker

[57] ABSTRACT

A multiway switching valve includes a valve member which is mounted in an internal compartment of a housing member for displacement between two terminal positions. The valve member is retained in each of the terminal positions by a respective magnet, especially a permanent magnet of an annular configuration which bounds a passage in which a magnetically attractable portion of the valve member is received in the respective terminal position. The housing and valve members are provided with abutments which abut one another in each of the terminal positions, the abutments being so located that the magnetically attractable portions of the valve member are out of contact with the housing member even in the terminal positions of the housing member. The magnetically attractable portions of the valve member are so dimensioned as to be spaced from the annular magnets even when the valve member assumes the terminal positions thereof.

2 Claims, 1 Drawing Figure

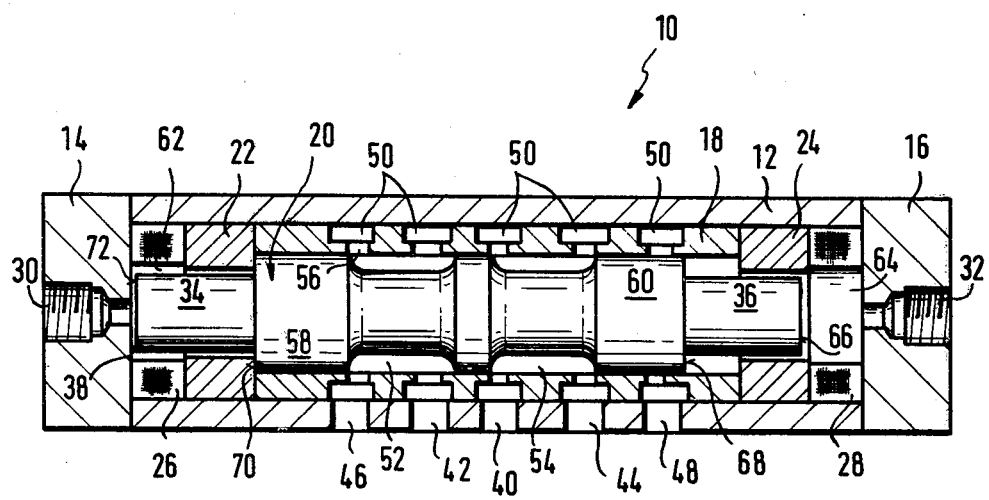

MULTIWAY SWITCHING VALVE

BACKGROUND OF THE INVENTION

The present invention relates to a valve for use in controlling the flow of fluids in general, and more particularly to a multiway switching valve for use in controlling the flow of gaseous fluids.

Valves of this general type are already known and in widespread use. Usually, a valve of this type includes a housing member which bounds a compartment, and a valve member which is mounted in the compartment for displacement between two terminal positions.

Under many circumstances, it is required that the control member of the valve of this type, that is, the valve member which may be elongated and mounted in the compartment of the housing member for longitudinal displacement, be securely retained in its terminal positions, in order to assure that the control portions thereof, such an annular lands, not be lifted or displaced with respect to the cooperating portions of the housing member owing to acceleration or deceleration forces, oscillations or the weight of the valve member. For this reason, it is necessary to provide an arrangement for arresting or retaining the valve member at least in one of the terminal positions thereof, especially when the valve is to be so mounted that the longitudinal axis thereof extends vertically or, generally speaking, at an angle to the horizontal or to a plane with respect to which all forces acting on the valve member act normal.

In order to achieve such an arresting action, it has already been proposed to use spring-biased balls which are movably mounted on one of the housing and valve members and are capable of entering corresponding recesses in the other of the housing and valve members. So, for instance, it has already been proposed to movably mount the balls in the housing member, and to form the recesses as annular grooves in the longitudinally slidable valve member. When this construction is resorted to, the balls are displaced against the spring forces acting thereon out of the respective annular groove when the displacement of the valve member from one to the other of its terminal position is initiated, as a result of which the arresting action of the balls is discontinued.

Arresting arrangements of this kind are very susceptible to malfunction during the operation of the valve. So, for instance, the balls or the springs can jam, or the arresting arrangement may become inoperative when dimensional changes take place in the valve during the operation thereof such as, for instance, as a result of deformation of sealing members or for similar reasons.

It has also been established that malfunctions occur especially when the respective valve is used in a circuit containing dry pressurized air inasmuch as the balls are not being lubricated under these circumstances and thus suffer a very considerable wear. This can result, especially in connection with valves having a high switching frequency, relatively rapidly in a complete deterioration of the balls or in a braking or other failure of the springs.

SUMMARY OF THE INVENTION

Accordingly, it is a general object of the present invention to avoid the disadvantages of the prior art.

More particularly, it is an object of the present invention to so construct a valve equipped with an arresting arrangement as not to be possessed of the disadvantages of the conventional valves of this type.

Still another object of the present invention is to so design the valve as to, for all intents and purposes, eliminate wear-related deterioration of the arresting arrangement.

A concomitant object of the present invention is to develop a valve equipped with an arresting arrangement, which is simple in construction, inexpensive to manufacture, and reliable in operation nevertheless.

In pursuance of these objects and others which will become apparent hereafter, one feature of the present invention resides in a valve, particularly a multiway switching valve, for use in controlling the flow of fluids, especially gaseous fluids, which comprises, briefly stated, a housing member bounding an internal compartment; a valve member mounted in the compartment for displacement between two terminal positions; means for selectively displacing the valve member into the terminal positions thereof; and means for magnetically retaining the valve member in at least one of the terminal positions thereof. The magnetically retaining means includes at least one first portion connected to the housing member and at least one second portion connected to the valve member, at least one of the first and second portions being magnetically attracting and the other of the first and second portions being magnetically attactable. It is especially advantageous when the magnetically attracting portion is a permanent magnet.

According to a currently preferred advantageous embodiment of the present invention, the first portion has an annular configuration and bounds a passage and the second portion is then received in the passage of the first portion in the above-mentioned one terminal position of the valve member. Advantageously, the second portion has such dimensions as to be received in the passage of the first portion with a spacing between the first and second portions.

According to a further advantageous aspect of the present invention, cooperating abutment means are provided on the housing and valve members which abut one another when the valve member reaches the above-mentioned one terminal position thereof. The abutment means are so situated that, when the valve member reaches the one terminal position thereof, the second portion of the valve member is spaced from an end wall of the housing member which is elongated in the direction of the displacement of the valve member, which end wall is located adjacent the first portion of the housing member which receives the second portion of the valve member in the one terminal position thereof. In this manner, the second portion is out of contact with all components of the housing member even when the valve member assumes the one terminal position thereof in which the second portion is received in the passage of the first portion so that neither the first portion nor the second portion are subjected to any wear which would otherwise result if these portions were in sliding contact with one another.

When magnets, especially permanent magnets, are used for the retention of the valve member in the terminal positions thereof, in accordance with the present invention, there are obtained several advantages. First of all, the need for using parts which are subjected to wear, such as balls or springs, is avoided and a contactless, wear-proof retention of the valve member in its terminal positions is obtained. Furthermore, it is no longer necessary that the valve member assume an exact predetermined position relative to the housing member when reaching its terminal position, unlike in the event when mechanical arresting means are used for retaining the valve member in the terminal portions thereof. This is attributable to the fact that small dimensional changes, for instance, those resulting from wear of the housing and valve members, are compensated for by the respective magnet when the contactless retaining arrangement of the present invention is used.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The sole FIGURE of the drawing is a longitudinal sectional view of an exemplary embodiment of a valve which is equipped with a retaining arrangement according to the present invention.

DESCRIPTION OF THE PREFERRED EMBODIMENT

Referring now to the drawing in detail, it may be seen that the reference numeral 10 has been used to indicate a valve, particularly a multiway switching valve, in toto. The valve 10 has a housing 12 including end walls 14 and 16 which are illustrated as being discrete end plates. A guide sleeve 18 is incorporated in the housing 12, and a valve member or slide 20 is received in the sleeve 18 for displacement longitudinally thereof along its longitudinal axis between two terminal positions, the slide 20 being illustrated in the drawing as assuming one of the terminal positions thereof. An abutment ring 22 or 24 adjoins the longitudinal end faces of the guide sleeve 18. Each of the abutment rings 22 and 24 is provided with a central bore whose diameter is sufficiently large to let respective end portions 34 or 36 of the slide 20 pass therethrough with a radial play.

A permanent magnet 26 is arranged in an axial spacing between the end plate 14 and the abutment ring 22. Analogously thereto, a permanent magnet 28 is arranged in the axial spacing between the end plate 16 and the abutment ring 24. The permanent magnets 26 and 28 have annular configurations and each has a central passage in which the respective end portion 34 or 36 of the slide 20 can enter. As also seen in the drawing, the end portion 34 is received in the respective passage of the magnet 26 with a radial spacing 62. In other words, the end portion 34 does not come into contact with the magnet 26. A similar situation also exists between the end portion 36 and the magnet 28 when the slide 20 assumes its other, non-illustrated, terminal position, between the end portion 36 of the valve member and the magnet 28. The radial dimension of the spacings 62 between the respective magnet 26 or 28 and the respective end portion 34 or 36 of the slide 20 is advantageously selected in accordance with magnetic considerations.

Each of the end plates 14 and 16 is provided with a respective port 30 or 32 for the admission of an operating medium, for instance, dry pressurized air, which operating medium displaces the slide 20 between and into its two terminal positions.

The housing 12 has an inlet port 40, two user ports 42 and 44 and two relief ports 46 and 48. The ports 40 to 48 communicate, via annular channels 50 and radial channels 56 in the guide sleeve 18, with annular control chambers 52, 54 arranged between the guide sleeve 18 and the slide 20.

In the illustrated terminal position of the slide 20, the inlet port 40 communicates, via the annular chamber 54, with the user port 44, while the user port 42 is in communication, via the annular chamber 52, with the relief port 46. In the other, non-illustrated, terminal position, the inlet port 40 communicates with the user port 42, while the user port 44 is in communication with the relief port 48. Having so described the construction of the valve 10 of the present invention, the operation thereof will now be briefly discussed. To obtain the illustrated position of the slide 20, pressurized air is admitted through the port 32 in a chamber 64 which is delimited by an end face 66 of the end portion 36 and an annular shoulder 68 of a control land 60 which is a constituent part of the slide 20, so that the pressurized air acts on the end face 66 and on the annular shoulder 36. As a result of the pressure exerted by the pressurized air on the end face 66 and on the annular shoulder 68, the slide 20 is displaced leftwardly into the terminal position thereof which is illustrated in the drawing. In this terminal position, a shoulder 70 of a control land 58, which is also a constituent part of the slide 20, abuts the abutment ring 22. The shoulder 70 of the control land 58 and the abutment ring 22 are so positioned that an axial gap 38 remains between an end face 72 of the end portion 34 and the end plate 14. As may be ascertained from the drawing, the end portion 34 is received in the central bore of the annular magnet 26 without contacting either the magnet 26 or the end plate 14. The magnetic force of the permanent magnet 26, that is, the mutual magnetic influence between the magnet 26 and the end portion 34, retains the slide 20 in this terminal position. When it is desired to switch the valve 10, that is, to displace the slide 20 into its other terminal position, pressurized air is introduced through the port 30 as a result of which first the end face 72 of the end portion 34 and, after the slide 20 has moved somewhat in the rightward direction, also the annular shoulder 70 of the control land 58, is or are subjected to the pressure of the pressurized air, as a result of which the slide 20 is displaced into its non-illustrated other terminal position and the valve 10 is thereby switched. In this other terminal position, the shoulder 68 of the control land 60 abuts the abutment ring 24 and the end portion 36 is received, in a contactless manner, in the central bore of the permanent magnet 28. The slide 20 is then retained, in a manner corresponding to that discussed above, in this terminal position by the magnetic force of the magnet 28. Thus, when it is desired to displace the slide 20 from one into the other of its terminal position, that is, to switch the valve 10, the force of the respective manget 26 or 28 which holds the slide 20 in its respective terminal position must be overcome by the force exerted by the pressurized medium on the slide 20. As illustrated, the end portion 34 of the slide 20, which is preferably of a cylindrical configuration, is fully accommodated in the passage of the magnet 26, with the exception of the gap 38, while the end portion 36 of the slide 20, which is also preferably of a cylindrical configuration, is situated completely out of the passage of the magnet 28 in the illustrated position.

The present invention renders it possible to achieve a fully contactless retaining of the slide 20 in its respective end position, as a result of which any wear otherwise attending the retention operation is avoided. The retaining action of the magnets 28 and 26 is sufficiently pronounced to maintain the slide 20 in its then assumed terminal position even when the valve 10 is subjected to oscillations or shocks as well as when the longitudinal axis of the valve 10 extends vertically.

It will be understood that each of the elements described above, or two or more together, may also find a useful application in other types of constructions differing from the types described above.

While the invention has been illustrated and described as embodied in a multiway switching valve for controlling the flow of gaseous media, it is not intended to be limited to the details shown, since various modifications and structural changes may be made without departing in any way from the spirit of the present invention. So, for instance, while the invention has been described as embodied in a valve 10 in which the slide 20 is magnetically retained in each of its terminal positions, it is also contemplated by the present invention to employ the same concept in a different valve in which it is not necessary to magnetically retain the slide 20 in one of its terminal positions, for instance, when the slide 20 is safely retained in one of its terminal positions by its own weight. Under these circumstances, one of the magnets 26 and 28 and the corresponding magnetically attractable end portion 34 or 36 of the slide 20 can be omitted.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A valve for use in directing the flow of at least one controlled fluid in response to the flow of a controlling fluid, comprising a magnetically responsive elongated valve body having a first end, a second end, a center intermediate the ends, a central beam elongated along a working axis and extending between the ends, and a plurality of partitions which plurality includes a first partition and a second partition, the partitions extending radially outwardly from the beam perpendicular to the working axis, with the first partition being located near the first end and being spaced therefrom towards the center and the second partition being located near the second end and being spaced therefrom towards the center with the spacings being of equal length and any other partitions in the plurality being located intermediate the first and second partitions; first and second like annular abutment rings, the first abutment ring encircling the beam adjacent the first end of the valve body and the second abutment ring encircling the beam adjacent the second end of the valve body in a manner that the partitions are located intermediate the abutment rings and the valve body is movable back and forth along its working axis until one of the first and second partitions abuts its corresponding abutment ring; first and second like, annular permanent magnets, the first magnet adapted for receiving the first end of the beam when the first partition abuts the first abutment ring and thereby retaining the valve body in that position by magnetic attraction between the first magnet and the first partition and the second magnet adapted for receiving the second end of the beam when the second partition abuts the second abutment ring and thereby retaining the valve body in that position by magnetic attraction between the second magnet and the second partition; and a housing completely surrounding a working cavity in which the entire valve body, the abutment rings and the magnets are all located, the rings and the magnets being secured to the housing and the valve body being movable therein along its working axis in the above-described manner, the housing having a first controlling port adjacent the first end of the valve body to allow a controlling fluid to be introduced into the housing and to press against the first end to thereby urge the valve body away from the first magnet, the housing further having a second controlling port adjacent the second end of the valve body to allow a controlling fluid to be introduced into the housing and to press against the second end to thereby urge the valve body away from the second magnet, and the housing still further having a plurality of controlled ports spaced from each other and communicating with the working cavity and being connectable to and separate from each other via the cavity as a function of the position of the partitions on the valve body with respect to the locations of the controlled ports, whereby the flow of a controlled fluid entering the housing through at least one of the controlled ports may be directed into and blocked off from at least one other one of the controlled ports.

2. A valve as defined in claim 1, wherein the magnets are spaced from the ends of the valve body in a manner that the valve body never touches the magnets.

* * * * *